Patented June 24, 1941

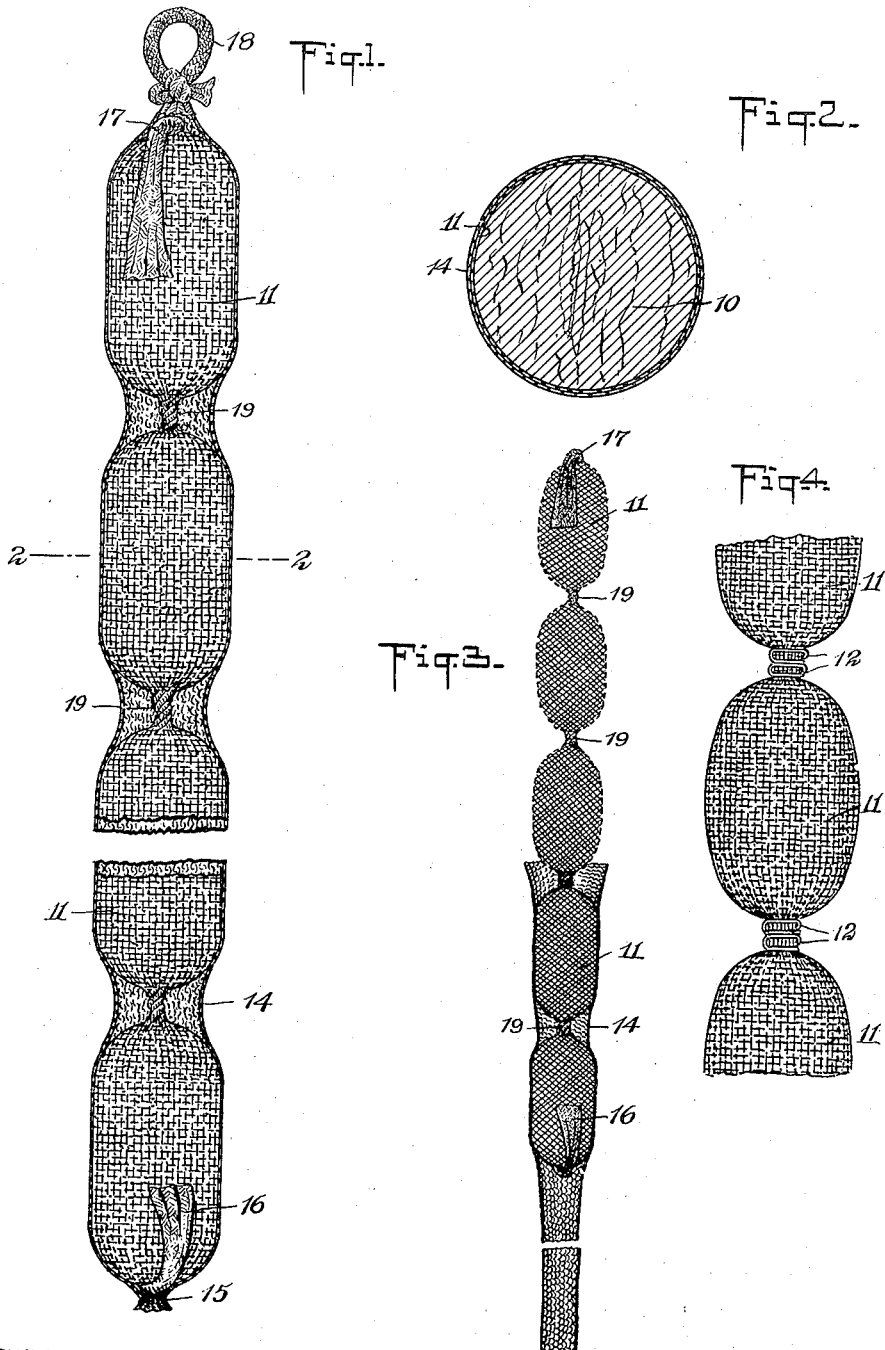

2,247,312

UNITED STATES PATENT OFFICE 2,247,312

MEAT PACKING PROCESS

Herbert Rumsey, Jr., Nutley, N. J.

Application August 19, 1939, Serial No. 290,993

3 Claims. (Cl. 99—174)

This invention relates to an improved meat packing process and more particularly to a method of molding meat products such as pork butts of a plastic or semi-plastic character.

In their original form pork butts and similar pieces of meat are irregular masses of meat of an unattractive and undesirable appearance. In order to impart the proper appearance to the butts they should first be molded to the desired shape and then subjected to the usual smoking operation, the smoking operation serving among other things to solidify the meat in the shape to which it has been molded.

It is an object of the present invention to provide an improved meat packing process in which pork butts and similar cuts of meat will be molded to a shape having an improved attractive appearance and in which the masses of fat will be more uniformly and thinly distributed.

A further object is the provision of an improved process of the above character which is relatively simple, which does not require the use of expensive apparatus, and in which the number of operations and the amount of labor is reduced to a minimum.

My improved process contemplates the application of pressure to the ends of the pork butts or similar masses of meat so as to mold the ends into a rounded unpointed form and also the application of a substantially uniform yielding pressure to the sides of the butts or other masses of meat so as to impart a substantially cylindrical shape to the central portion thereof. The resulting molded product is not only of improved appearance but also has a better distribution of the fat masses.

For a fuller understanding of my invention reference should be had to the accompanying drawing in which Fig. 1 is a front elevation of a plurality of pork butts assembled in tubular flexible elastic porous casings so as to apply the desired pressure to the butts in carrying out my improved process;

Fig. 2 is a cross-sectional view on the line 2—2 of Fig. 1;

Fig. 3 is a view of a plurality of pork butts assembled in a tubular casing and showing the manner in which one casing is inserted in another in carrying out my invention; and Fig. 4 is a detailed view of a portion of a tubular casing having pork butts therein and showing a modified manner of constricting or compressing the casing between the butts so as to apply pressure to the ends thereof.

I have found that it is desirable to mold the irregular pork butts or similar masses of plastic or semi-plastic meat into a substantially cylindrical form having unpointed ends which may be either more or less rounded or flat. This shape is of an attractive appearance but in addition I have found that the application of pressure to the sides of the masses of meat so as to mold it into cylindrical form and also the elongation of the product resulting from its suspension in the outer casing as described herein produces a better distribution of the fatty tissues of the meat and eliminates fatty layers of undue thickness.

I have found that the desired shape can be attained by applying pressure to the ends of the respective meat masses and also by applying yielding pressure of a substantially uniform character to the sides thereof. The application of the proper pressure can be obtained in the manner hereinafter described by means of tubular flexible elastic porous casings of the character illustrated in the drawing. Casings of this character are well known in the art being generally designated by the name stockinette and are made of knitted textile material which produces the desired elasticity. The casings should be of such a diameter that there is a relatively tight fit between the meat masses and the casings so as to facilitate the application of pressure as hereinafter described.

In carrying out my process I first insert the pork butts indicated by the numeral 10 in a stockinette of this character which is indicated by the numeral 11. A plurality of butts, as for instance five, may be inserted in closely spaced relationship in a single stockinette. After the butts have thus been arranged longitudinally of the stockinette I constrict or compress the stockinette between each of the butts so as to exert the desired pressure primarily against the ends of the butts to mold them into a rounded unpointed shape. This is preferably accomplished by twisting the casing 11 between the several adjacent pork butts as shown at 19 in Figs. 1 and 3. It will be appreciated that by increasing or decreasing the amount of twist the amount of pressure exerted by the casing against the butts may be varied. In each instance the casing should be twisted sufficiently so as to cause the stockinette to compress the ends of the butts into a rounded unpointed form as shown in the drawing.

Instead of obtaining the desired pressure by twisting the casing between adjacent butts I may utilize staples or clips as shown at 12 in Fig.

4. When this particular method is employed the casing is pulled tightly around each butt so as to apply the necessary pressure to the ends to compress and mold them into rounded unpointed form. The staples or clips 12 are then applied in a well-known manner directly above and below each of the pork butts so as to maintain them in the desired compressed condition.

It will be appreciated that the stockinette 11 when constricted or compressed between each of the pork butts in either of the manner just described applies pressure not only to the ends of the butts but to the other portions thereof. However, I utilize this pressure primarily for shaping the ends of the butts and I have found that the pressure which is applied to the other portions of the butts by means of the casing 11 produces a bulging rounded formation adjacent the central portion of the butts as shown in Figs. 3 and 4.

As previously stated, I have also found that it is desirable to eliminate this bulging rounded portion and to mold the butts into a substantially cylindrical form and I accomplish this by applying uniform yielding pressure to the sides of the butts. This I accomplish in a simple and effective manner by inserting the casing 11 having the pork butts therein and in its twisted relation into a second or outer casing 14 which is of tubular elastic porous construction similar to casing 11. For this purpose the casing 14 should be closed at one end 15 as by means of stitching or a staple or some similar fastening means and one end of the casing 11 is then inserted through the open end of the casing 14 until it rests against the closed end 15. When this is done the lower end 16 of the casing 11 may be twisted so as to apply the desired pressure against the pork butt and it may then be inserted in casing 14 so as to rest between the two casings, as shown, with the result that the pressure exerted by casing 14 will prevent it from untwisting. Similarly, the upper end 17 of casing 11 may be twisted in this manner, and inserted between the outer casing 14 and the portion of casing 11 which surrounds the uppermost pork butt in the manner shown in Fig. 1 so as to prevent it from untwisting. Of course it will be appreciated that if desired staples or clips may be applied to the ends 16 and 17 although this is not necessary.

After casing 11 and its enclosed butts have been fully inserted into the casing 14 as shown in Fig. 1 the upper end of the casing 14 may be tied in a loop as indicated at 18 and the entire assembly is supported in hanging fashion from the loop. Since the casing 14 is of flexible elastic construction the pulling action resulting from the weight of the pork butts supported in the casing 14 causes the casing 14 to constrict with the result that a substantially uniform pressure of a yielding character is exerted around the sides of the butts eliminating the bulging or rounded central portion and producing a substantially cylindrical shape. The outer casing carries the weight of the butts thereby relieving the inner casing of this strain. Due to this fact and also due to the fact that the outer casing contracts and yieldingly grips the butts the butts are held in properly spaced relationship and in such a manner as not to become unduly distended. The outer casing also serves to prevent the inner casing from untwisting.

When I am packing meat, such as pork butts, which is to be smoked I suspend the assembly by the loop 18 while it is being washed and while it is subjected to the usual heating and smoking operation. The heating and smoking operation solidifies or rigidifies the butts in the shape in which they have been molded, and they may then be treated and packaged in the usual manner.

It will thus be seen that I have provided an improved meat packing process, particularly suitable for use in molding pork butts and similar meat products which is relatively simple, which does not require expensive apparatus, and which reduces the number of operations and the amount of labor required to a minimum. It will also be seen that the product resulting from my process is of an improved more marketable appearance and has a better distribution of the fat masses. It should be understood of course that modifications may be made in the illustrated and described embodiments of my invention without departing from the invention as set forth in the accompanying claims.

I claim:

1. The method of molding an irregular mass of meat which comprises providing a tubular flexible elastic porous casing, placing the irregular mass of meat in the casing, compressing the tube above and below the mass so as to exert sufficient pressure against the ends thereof to mold them into rounded unpointed form, providing a second tubular flexible elastic porous casing, inserting the first casing while thus compressed with the mass of meat therein into the second casing with the ends of the mass of meat facing towards the top and bottom respectively of the second casing and finally suspending the entire assembly adjacent one end of the second casing so that the weight of the assembly causes the second casing to become more elongated and to contract and exert substantially uniform yielding pressure around the sides of the mass to mold it into cylindrical form.

2. The method of molding and smoking pork butts and similar pieces of meat which comprises providing a tubular flexible elastic porous casing, placing a plurality of butts in the casing at intervals longitudinally thereof, compressing the casing above and below each butt so as to exert sufficient pressure against the ends thereof to mold them into rounded unpointed form, providing a second tubular flexible elastic porous casing, inserting the first casing while thus compressed with the butts therein into the second casing with the ends of the butts facing towards the top and bottom respectively of the second casing, suspending the entire assembly adjacent one end of the second casing so that the weight of the assembly causes the second casing to become more elongated and to contract and exert substantially uniform yielding pressure around the sides of the butts to mold them into cylindrical form, and finally while the pressure is thus applied subjecting the butts to a smoking operation so as to solidify them in their molded form.

3. The method of molding and smoking pork butts and similar pieces of meat which comprises providing a tubular flexible elastic porous casing, placing a plurality of butts in the casing at intervals longitudinally thereof, twisting the casing between the butts so as to to exert sufficient pressure against the ends thereof to mold them into rounded unpointed form, providing a second tubular flexible elastic porous casing, inserting the first casing while thus compressed with the butts therein into the second casing with the ends of the butts facing towards the top and bottom respectively of the second casing, suspending the entire assembly adjacent one end of the second casing so that the weight of the assembly causes the second casing to become more elongated and to contract and exert substantially uniform yielding pressure around the sides of the butts to mold them into cylindrical form, said second casing also serving to hold the butts in properly spaced relationship and to prevent the first casing from untwisting, and finally while the pressure is thus applied subjecting the butts to a smoking operation so as to solidify them in their molded form.

HERBERT RUMSEY, JR.